US011138134B2

(12) United States Patent
Dracea et al.

(10) Patent No.: US 11,138,134 B2
(45) Date of Patent: Oct. 5, 2021

(54) NON-INTRUSIVE SEMIHOSTING SOLUTION FOR DEBUG USING DIRECT MEMORY ACCESS IMPLEMENTATION-BASED LIBRARY

(71) Applicant: NXP USA, Inc., Austin, TX (US)

(72) Inventors: Alexandra Dracea, Comarnic (RO); Catalina D. Mitulescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 3 days.

(21) Appl. No.: 16/661,130

(22) Filed: Oct. 23, 2019

(65) Prior Publication Data
US 2020/0371969 A1    Nov. 26, 2020

(30) Foreign Application Priority Data
May 22, 2019    (RO) .................................. A201900304

(51) Int. Cl.
*G06F 13/16*    (2006.01)
*G06F 11/36*    (2006.01)

(52) U.S. Cl.
CPC .......... *G06F 13/16* (2013.01); *G06F 11/3648* (2013.01); *G06F 11/3664* (2013.01); *G06F 2213/2802* (2013.01)

(58) Field of Classification Search
None
See application file for complete search history.

(56) References Cited

U.S. PATENT DOCUMENTS 5,978,902 A  * 11/1999 Mann .................... G06F 11/348
                                                 712/227
6,125,416 A  *  9/2000 Warren ............... G06F 11/3656
                                                 710/71
9,384,106 B2    7/2016 Segger
9,835,682 B2   12/2017 Hsu et al.
2007/0174507 A1*  7/2007 Conti ...................... G06F 21/85
                                                 710/22
2009/0031001 A1*  1/2009 Archer .................... G06F 13/28
                                                 709/212
2016/0292057 A1  10/2016 Segger
2016/0299859 A1  10/2016 Popa et al.
2016/0315922 A1* 10/2016 Chew .................... H04L 63/061
2018/0307638 A1* 10/2018 Jin .......................... G06F 13/28

OTHER PUBLICATIONS

ARM Compiler Version 5.05 Software Development Guide, section 7.1, What is Semihosting, pp. 7-147-7-149, © 2010-2014 ARM.

* cited by examiner

*Primary Examiner* — Idriss N Alrobaye
*Assistant Examiner* — Dayton Lewis-Taylor

(57) ABSTRACT

A software only debug approach is provided that does not require special hardware in a target embedded system undergoing debug. Instead, already present DMA capabilities of the target system are utilized to transfer I/O operation parameters into a memory area accessible to both the target processor and a debugger executing on a host system. The debugger can thereby access and execute the I/O operations without program execution stopping on the target. A semihosting library is provided as a replacement for the standard C I/O library on the target. The semihosting library provides a range of equivalent functions to the standard C I/O API that program a DMA transfer to copy the I/O function parameters to an external memory area that is not otherwise being used by the target core processor. The external memory area is then accessed by a debug tool on the host computer.

18 Claims, 4 Drawing Sheets

NON-INTRUSIVE SEMIHOSTING SOLUTION FOR DEBUG USING DIRECT MEMORY ACCESS IMPLEMENTATION-BASED LIBRARY

BACKGROUND

Field

This disclosure relates generally to debugging of embedded systems, and more specifically, to the use of DMA accessible memory to communicate I/O requests between a target computer and a debugging host computer.

Related Art

An embedded computing system (or embedded system) may include an electrical system controlled by one or more processors or central processing units as well as memory and input/output (I/O) units. Examples of embedded systems include: appliances, such as microwaves, dishwashers, ovens, and refrigerators; telecommunications systems such as cordless phones, cell phones, and telephone base stations; automotive systems such as antilock brake systems and engine control systems; entertainment system such as portable audio players, movie players, and portable gaming devices; industrial systems that include industrial controls, measurement devices, medical devices, and the like.

Software for these embedded devices can be quite complex. The software is typically developed on one or multiple development computers. In early stages of development, this software typically goes through a debug process to ensure proper operation of the software in the target embedded system environment. Often, as part of this debug process, it is desirable to output debug messages that are useful in tracking application execution. In a typical debug system, output debug messages are provided using a library that requires a debug tool to halt execution of a program executing on the target system when an I/O function is called, read I/O parameters from a memory stack, and resume execution. Such an approach has several limitations, including intrusion on continued operation of programs on the target system, and instability of a target processor having reduced memory. Previous solutions to overcome these limitations introduce additional overhead, including additional hardware and associated libraries to support that hardware, which in turn can occupy additional space on the target system.

It is therefore desirable to introduce a debug solution that introduces minimal disruption of program execution on a target embedded system, while at the same time utilizing hardware already present on the target system.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
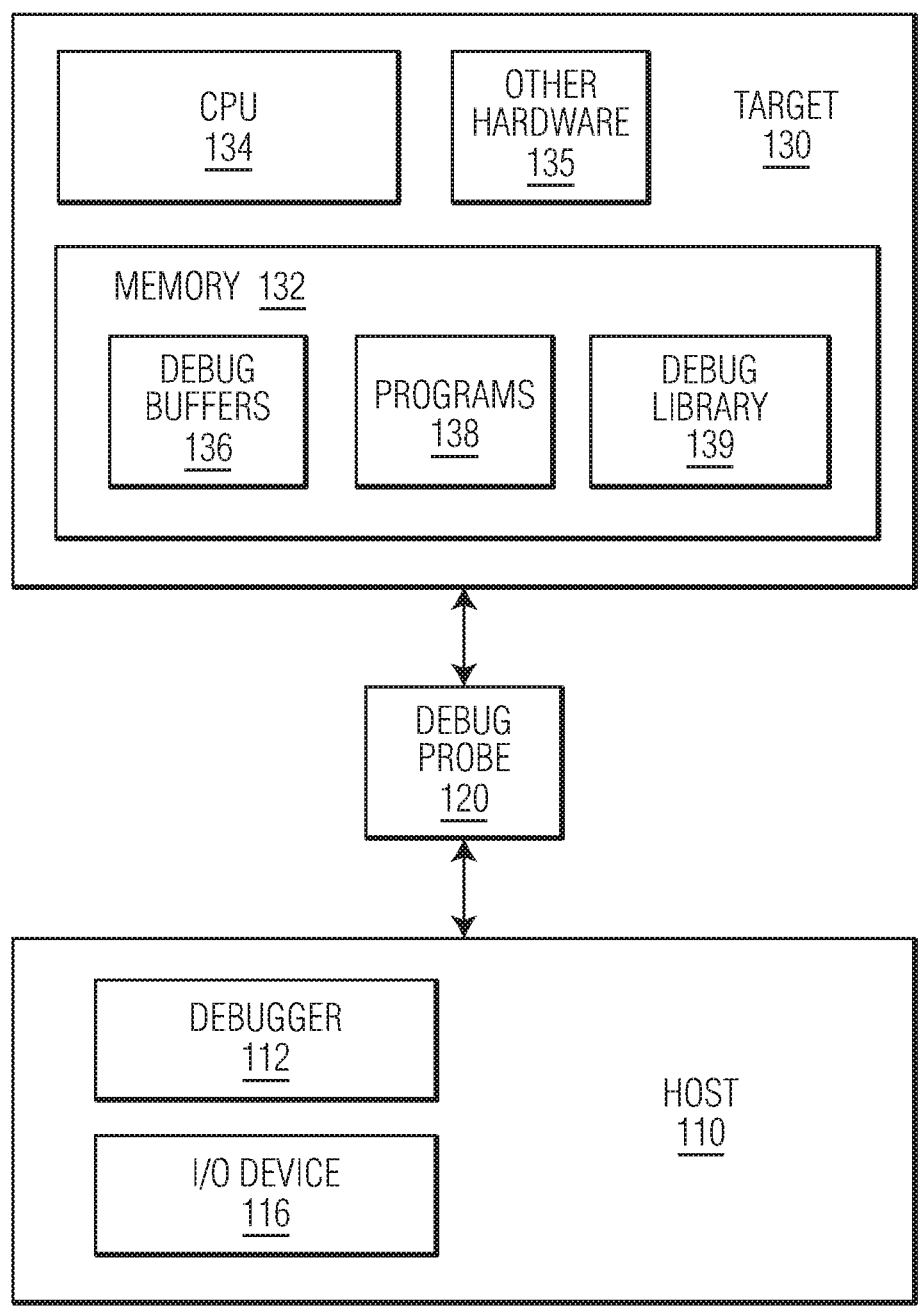
FIG. 1 is a simplified block diagram illustrating one example of a prior art debug system in which a host system communicates with a target system via a debug probe coupled to a serial connection.

Embodiments of the present invention provide a software-only debug approach that does not require special hardware to be provided by a target embedded system undergoing debug. Instead, already present DMA capabilities of a target system are utilized to transfer I/O operation parameters into a memory area that is accessible to both the target processor and a debugger executing on a host system. In this manner, the debugger can access and execute the I/O operations without stopping program execution on the target. The solution is provided by using a semihosting library as a replacement for the standard C I/O library. The semihosting library provides a range of equivalent functions to the standard C I/O API that program a DMA transfer to copy the I/O function parameters to an external memory area that is not otherwise being used by the target core processor. The external memory area is then accessed by a debug tool on the host computer while the target continues to execute core applications.

A feature that is desirable during the debug operations of embedded systems is providing device I/O operations, such as status messages, terminal I/O, disk operations, and the like. Such operations can be provided in response to a debugging breakpoint being reached in program code or elsewhere during execution of a program. With breakpoint systems, the target CPU is halted, requiring about 10-100 ms to provide one I/O operation. Such a procedure can include the following steps: a function in the software of the target embedded system outputs a string or a character containing a breakpoint; when the target system encounters the breakpoint, the target system is halted; debug software executing on a host computer reads the content of one or more CPU registers on the target to determine the reason for the halt; the debugger reads a part of the target system's memory to read the output instruction; and, then the target system is restarted. This can leave the target system in a halted state, in which it is unresponsive, for about 5-50 ms.

As a result of such delays in existing debug systems, debugging can interrupt the real-time operation of the system, resulting in non-real-world conditions for the software. Thus, problems with real-time operation of an embedded system may not be properly identified. This results in delays in addressing problems of program code, increased development time, and some bugs may not be properly fixed at all.

In order to overcome some of these issues, solutions have been implemented that require additional hardware, which adds additional libraries to support that hardware. Consequently, the debug application occupies more physical space and becomes more complex. For example, one solution provides sending I/O messages over a serial port or ethernet connection. A downside of this solution is that the serial port or ethernet can be needed for other purposes by the application or, in the case of ethernet, not all target systems having such hardware. Another example uses dedicated hardware registers to transfer data between a target system and host system. An issue with this solution is that target systems may not have this capability.

FIG. 1 is a simplified block diagram illustrating one example of a prior art debug system 100 in which a host system communicates with a target system via a debug probe coupled to a serial connection. Host 110 can be any computing device or even another embedded system. The host system includes a debugger 112, which can include debugger software that sends or receives data to or from target system 130 through debug probe 120. One example of debugger software used by many UNIX systems is the GDB debugger. Debugger 112 can be loaded into a memory of the host system and executed by a processor of host 110. Host 110 also includes one or more I/O devices 116 that can be accessed by debugger 112 in response to I/O operations provided by target 130.

Target 130 includes a memory 132, a central processing unit (CPU) 134, and, optionally, other hardware 135 such as I/O ports, timers, data storage devices, sensors, and the like. CPU 134 can be a hardware processor including a single core or multiple cores. Target 130 can also include multiple discrete CPUs 134. Memory 132 can include RAM or ROM. As illustrated, memory 132 stores one or more programs 138 that can be configured to execute in either real-time or non-real-time, and one or more debug buffers 136. Debug buffers 136 can include one or more cyclic or circular buffers, such as one for terminal-out and a second for terminal-in. Since debug buffers 136 are circular or ring buffers, each debug buffer can be a fixed size or dynamically sized. This is an example of the additional hardware needed to support this prior art debug system.

When an executing program 138 writes text to a terminal output, for example, the program can call one or more debug subroutines of debug library 139 stored in memory 132. The debug library can be a code module, component, or the like, which is statically linked or dynamically linked to program 138. The debug subroutines operate to store the text in a debug buffer 136. After copying text to the buffer, the debug subroutine can update a write pointer associated with debug buffer 136.

Debug probe 120 periodically reads the write pointer and the memory that has been written into buffer 136, thereby receiving the text written by program 138. Debug probe 120 can then update a read pointer to indicate that the text has been read, enabling the debug probe to read starting from an appropriate address next time the data is inserted into buffer 136. Thus, target system 130 writes to debug buffer 136, and host system 110 reads debug buffer 136 through debug probe 120. As discussed above, debug probe 120 can be coupled to target 130 using, for example, a serial port.

Figure 2:
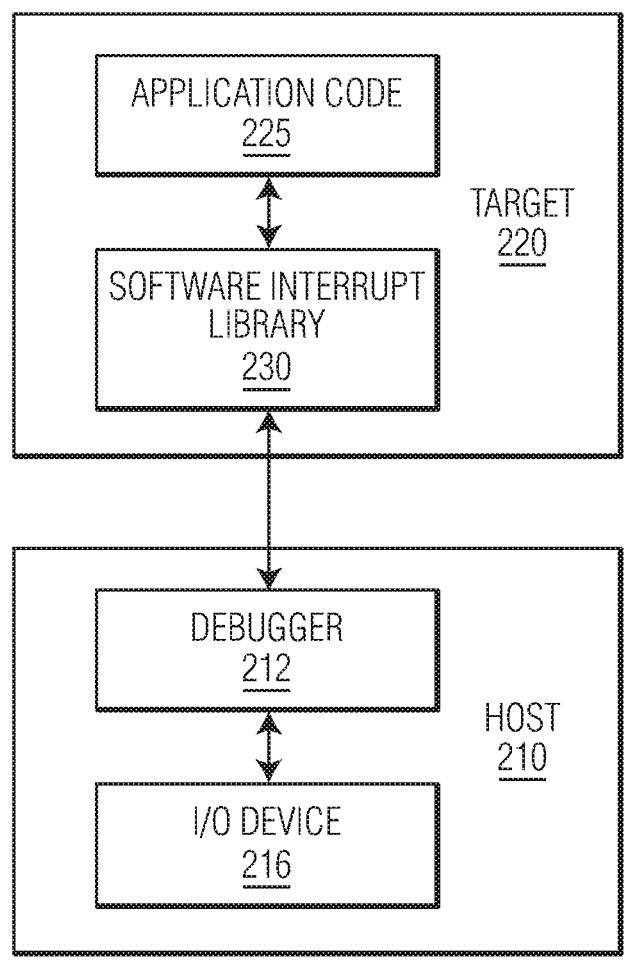
FIG. 2 is a simplified block diagram illustrating another example of a prior art debug system in which a host system communicates with a target system using a semihosting application.

FIG. 2 is a simplified block diagram illustrating another example of a prior art debug system 200 in which a host system communicates with a target system using a semihosting application. Semihosting is a mechanism that enables code executing on a target to communicate I/O requests to a host computer running a debugger and to utilize the I/O facilities located on the host computer. For example, semihosting can be used to enable functions in the C library to use the screen and keyboard of the host instead of having a screen and keyboard on the target system. Traditional semihosting is implemented by a set of defined software interrupt (SWI) operations. The target application invokes the appropriate SWI and the debug agent on the host then handles the SWI exception. Semihosting is traditionally implemented using breakpoint-type instructions.

As with the example shown in FIG. 1, host 210 can be any computing device or even another embedded system. The host system includes a debugger 212, which can be debugger software that can send or receive data to or from target 130. Debugger 212 is loaded into a memory of the host system and executed in a processor of host 210. Host 210 can also include one or more I/O devices 216 that can be accessed by debugger 212 in response to I/O operations provided by target 220.

Target 220 can include hardware like that discussed above with regard to FIG. 1. As illustrated in FIG. 2, an application code 225 executes on a CPU of target 220. As discussed above, in order to implement semihosting, a set of defined software interrupt operations are provided by software interrupt library 230. When application code 225 calls one of the instructions in software interrupt library 230, the execution of the instruction is trapped by debugger 212 to determine what operation is being requested. Once this determination is made, the debugger 212 will then read data from target 220 and perform the appropriate I/O operation on host 216.

Traditional semihosting mechanisms do not provide a high performance I/O system. Each time a semihosting operation takes place, the target processor is stopped while data transfer takes place. The time this operation takes can depend upon a variety of factors such as the nature of the target's CPU, the link between host 210 and target 220, the host hardware, and the operating system on the host. All these factors combined can make application code 225 appear to run more slowly. Embodiments of the present invention avoid these limitations.

Figure 3:
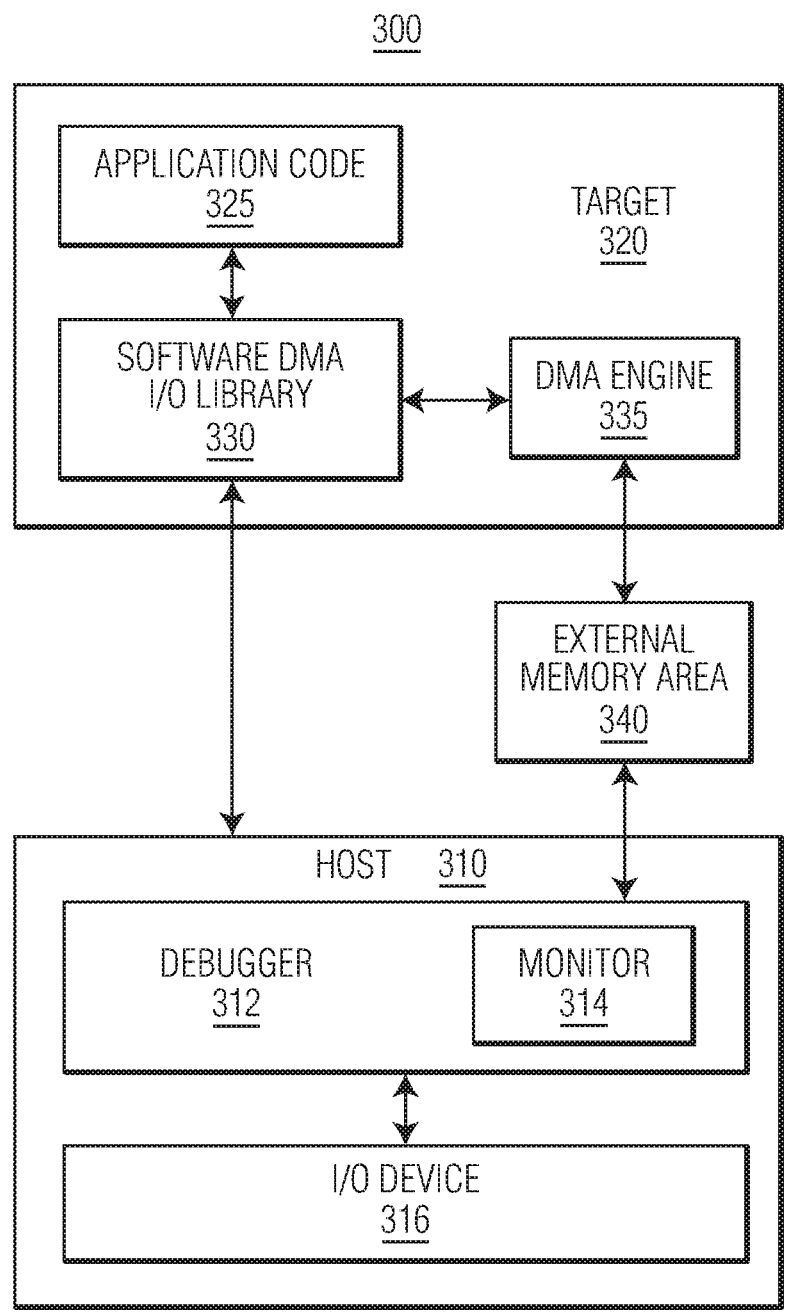
FIG. 3 is a simplified block diagram illustrating an example of a debug system implementing a semihosting debug environment in accord with an embodiment of the present invention.

FIG. 3 is a simplified block diagram illustrating an example of a debug system 300 implementing a semihosting debug environment in accord with an embodiment of the present invention. Host 310 can communicate with target 320 directly and through a shared external memory area 340. Host 310 can be any computing device or even another embedded system, running a variety of operating systems. Host 310 includes a debugger 312, which can incorporate debugger software that is configured to send or receive data to or from target 320 when the debugger software is executing. Debugger 312 incorporates a monitor thread 314 that can determine when an I/O instruction has been received from target 320, as will be discussed in greater detail below. Debugger 312 is loaded into a memory of the host system and executed in a hardware processor of host 310. Host 310 also includes one or more I/O devices 316 that can be accessed by debugger 312 in response to I/O operations provided by target 320.

Target 320 can include hardware like that discussed above with regard to FIGS. 1 and 2. Application code 325 executes on a CPU of target 320. In order to implement a semihosting environment that does not require stopping of core execution of application code 325, a software only approach is used the takes advantage of the capabilities provided by DMA engine 335 to transfer I/O operation parameters into external memory area 340 that is accessible to debugger 312. External memory area 340 can be any kind of memory hardware accessible by DMA engine 335, including, for example, DDR memory. External memory area 340 can be physically within or external to target 320. Here, the term "external" refers to the memory area not being used by application code 325 or otherwise used by the target core, while being accessible to debugger 312 as target 320 continues to execute.

This solution is provided by a new semihosting library which replaces the standard C I/O library. Software DMA I/O library 330 provides a range of equivalent functions from the standard C I/O API, which is the most used for debugging purposes. This library has a significantly reduced size compared to the standard file I/O library, since this library will program only a DMA transfer, and the debugger tool will handle the I/O command parameters. The replacement API functions initiate a DMA transfer to copy the I/O function parameters to an external memory area 340. Debugger 312 accesses the external memory area while target 320 continues to execute. In this manner, I/O operation parameters that are transferred to external memory area 340.

Figure 4:
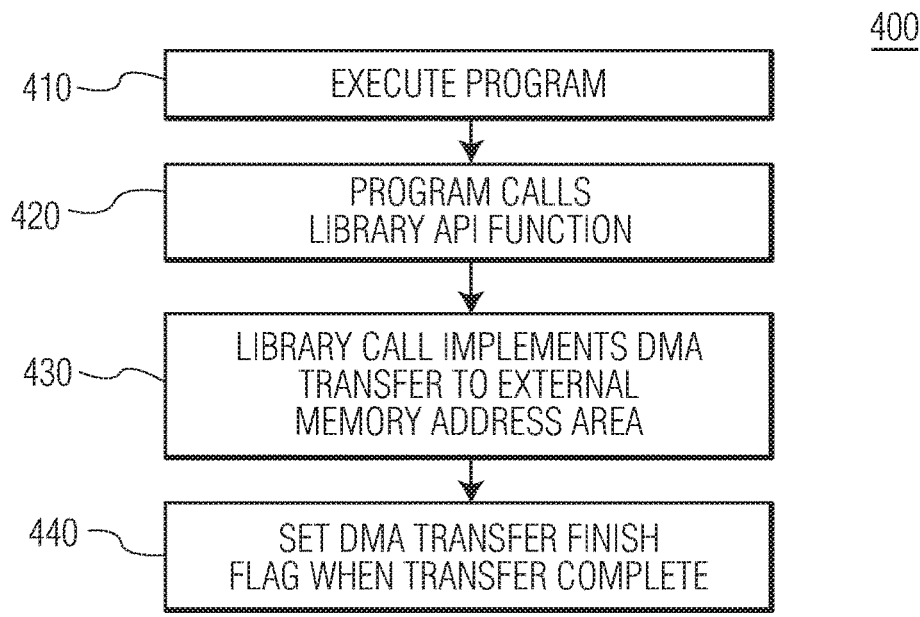
FIG. 4 is a simplified flow diagram illustrating an example of an execution flow performed on a target during debug operations, in accord with an embodiment of the present invention.

FIG. 4 is a simplified flow diagram illustrating an example of an execution flow performed on target 320 during debug operations, in accord with an embodiment of the present invention. The program being debugged (e.g., application code 325) is executed on the CPU of target 320 (410). This program is linked to software DMA I/O library 330 to provide the replacement I/O functions that utilize DMA transfer operations, in accord with embodiments of the present invention. At a point in the execution of application code 325, the program initiates an I/O operation and calls one of the library API functions (420). The library call implements a DMA transfer to external memory area 340 (430). As discussed above, external memory area 340 is accessible to debugger 312. The information transferred to the external memory area can include, for example, information related to the requested operation type, and input/output arguments associated with the operation type. When the DMA transfer is completed, a DMA transfer finish flag is set (440). The DMA transfer finish flag is set by the called library API function. Target 320 continues to execute application code 325 after the transfer of the information to the external memory area. Once the I/O operation information is transferred to external memory area 340, the information is ready to be read by debugger 312 on host 310.

Figure 5:
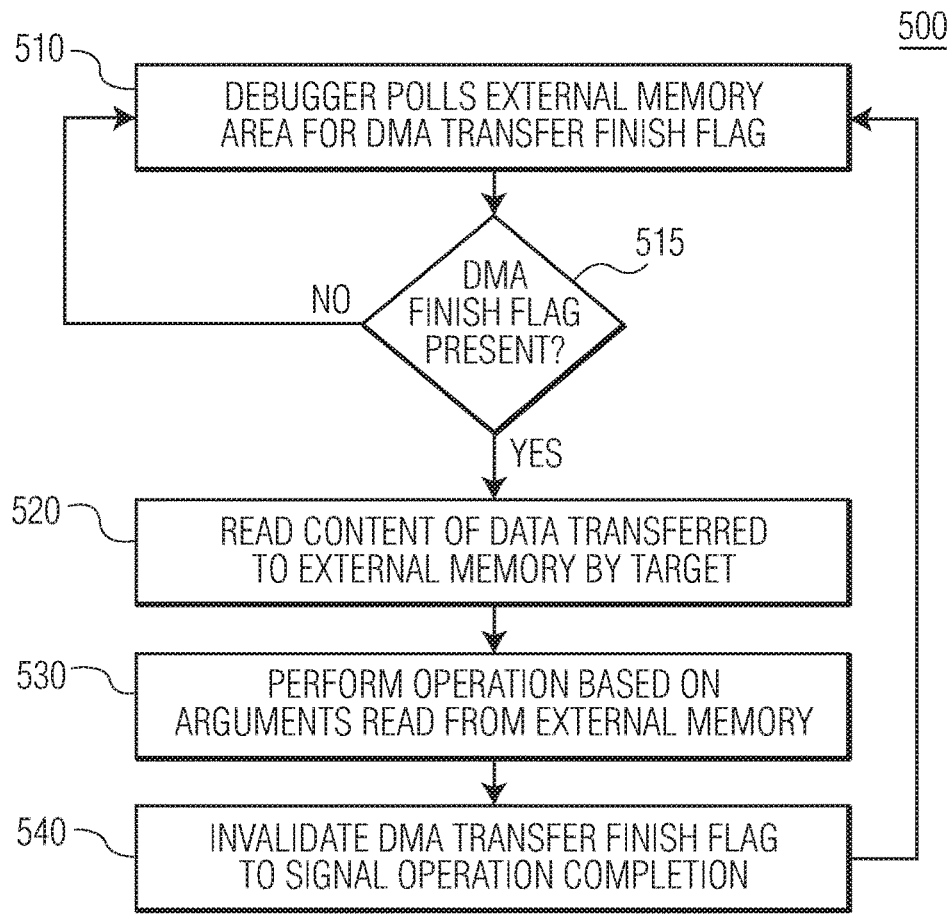
FIG. 5 is a simplified flow diagram illustrating an example of an execution flow performed by a host during debug operations, in accord with an embodiment of the present invention.

FIG. 5 is a simplified flow diagram illustrating an example of an execution flow performed by host 310 during debug operations, in accord with an embodiment of the present invention. As discussed with regard to FIG. 3, debugger 312 includes a debug monitor thread 314. Debug monitor thread 314 polls external memory area 340 for the presence of a DMA transfer finish flag (510). The presence of the DMA transfer finish flag is a signal that the DMA transfer of the I/O operation to external memory area 340 has been completed. If the DMA transfer finish flag is present (515), then debugger 312 reads the contents of the data transferred to the external memory area by target 320 (520). Debugger 312 can then perform the indicated I/O operation based on the arguments read from the external memory (530). After the parameters of the I/O operation have been processed by debugger 312 and the I/O operation is resolved, the debugger then invalidates the completion word as a sign to target 320 that the I/O operation has been completed. At this point, debug monitor thread 314 can return to polling the external memory area for the next I/O operation (510).

Embodiments of the present invention provide a more efficient and less intrusive debug I/O solution than traditional methods. With the software DMA I/O library programming only a DMA transfer to the external memory area, the memory size of the library is significantly smaller than that of prior art methods. In addition, the present method allows for I/O communication from an application executing on a target without halting target execution during the process of communicating the I/O information to the host computer and waiting for the host computer to service the I/O operation. This therefore allows for debugging of real-time applications while such applications execute in real time.

By now it should be appreciated that there has been provided a system for debugging an application code on a target computer. The system includes a host computer and a target computer. The target computer includes a target processor executing the application code, a direct memory access (DMA) engine, and a memory area accessible to the host computer and the DMA engine. The memory area is external to a memory used by the target processor to execute the application code. The application code is linked to a software DMA I/O library that includes one or more I/O functions configured to transfer I/O operation parameters to the memory area accessible to the host computer. The target computer is configured to continue executing the application code after the transfer of the I/O operation parameters to the memory area.

In one aspect of the above embodiment, the host computer includes a host processor executing a debugger where the debugger is configured to access the memory area. In a further aspect, the one or more I/O functions are configured to write a DMA transfer finish flag to the memory area when the DMA transfer is complete. In still a further aspect, the debugger includes a monitor thread configured to poll the memory area for the DMA transfer finish flag. In another further aspect, the debugger reads the I/O operation parameters from the memory after the monitor thread finds the DMA transfer finish flag, and the host computer executes an I/O operation on the host computer using the I/O operation parameters. In yet another further aspect, the debugger is configured to invalidate the DMA transfer finish flag upon completion of the I/O operation.

In another aspect of the above embodiment, the memory area is external to the target computer. In another aspect, the system includes a DDR memory that includes the memory area. In yet another aspect, the target computer comprises an embedded system.

Another embodiment provides a method for debugging an application code executing on a target processor coupled to a host processor. The method includes: calling an I/O function by the application code on the target processor; referring to a library application programming interface (API) function corresponding to the I/O function; and, performing a DMA transfer to a memory area accessible to the target processor in response to the library API function. The memory area is external to a memory used by the target processor to execute the application code and is accessible to a debugger executing on the host processor. The DMA transfer stores I/O operation parameters in the memory area.

In one aspect of the above embodiment, the I/O operation parameters include information corresponding to the requested operation type, and arguments associated with the requested operation type. In another aspect, the memory area is external to the target computer. In yet another aspect, the method further includes storing a DMA transfer finish flag in the memory area, by the target processor, when the DMA transfer is complete. In a further aspect, the method further includes continuing to execute the application code, by the target processor, after storing the DMA transfer finish flag.

Another embodiment provides a method for debugging an application code executing on a target processor coupled to a host processor. The method includes: polling a memory area for a DMA transfer finish flag by a debugger executing on the host processor; reading the data stored in the memory area, by the host processor if the DMA transfer finish flag is present; and, performing an I/O function associated with the data by the host processor. The DMA transfer finish flag is stored in the memory area by the target processor after the target processor stores data associated with an I/O function in the memory area. The memory area is external to a memory used by the target processor to execute the application code.

One aspect of the above embodiment further includes invalidating the DMA transfer finish flag after performing the I/O function. In another aspect of the above embodiment, the data associated with the I/O function includes information corresponding to a requested I/O operation type, and arguments associated with the requested operation type. In another aspect, the memory area is external to the target processor. In yet another aspect, the data associated with the I/O function further includes data stored by the target processor in response to calling the I/O function by the application code where a DMA transfer storing I/O operation parameters to the memory area is performed in response to a library API function. In still another aspect, the I/O function includes one of printing to a standard output, scanning from a standard input, and storing information in a memory.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 3 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, 200, and 300, for example, from computer readable media such as memory 132 or other media on other computer systems. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; M RAM; volatile storage media including registers, buffers or caches, main memory, RAM, etc.; and data transmission media including computer networks, point-to-point telecommunication equipment, to name a few.

In one embodiment, host 310 is a computer system such as a personal computer system. Other embodiments may include different types of computer systems. Computer systems are information handling systems which can be designed to give independent computing power to one or more users. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for debugging an application code on a target computer, the system comprising:
   a host computer; and
   the target computer, wherein the target computer comprises
      a target processor executing the application code,
      a direct memory access (DMA) engine,
      a memory area accessible to the host computer and the DMA engine, wherein
         the memory area is external to a memory used by the target processor to execute the application code,
         the application code is linked to a DMA I/O library comprising one or more I/O functions configured to transfer I/O operation parameters to the memory area for access by the host computer, wherein one of the one or more I/O functions is configured to write a DMA transfer finish flag to the memory area for access by the host computer when a DMA transfer of the I/O operation parameters to the memory area is complete, and
         the target computer is configured to continue executing the application code after the transfer of the I/O operation parameters by the DMA engine to the memory area.

2. The system of claim 1 wherein the host computer comprises:
   a host processor executing a debugger wherein the debugger is configured to access the memory area.

3. The system of claim 2 wherein the debugger comprises a monitor thread configured to poll the memory area for the DMA transfer finish flag.

4. The system of claim 3, wherein
   the debugger reads the I/O operation parameters from the memory after the monitor thread finds the DMA transfer finish flag, and
   the host computer executes an I/O operation on the host computer using the I/O operation parameters.

5. The system of claim 4 wherein the debugger is configured to invalidate the DMA transfer finish flag upon completion of the I/O operation.

6. The system of claim 1 wherein the memory area is external to the target computer.

7. The system of claim 1 further comprising a DDR memory that comprises the memory area.

8. The system of claim 1 wherein the target computer comprises an embedded system.

9. A method for debugging an application code executing on a target processor coupled to a host processor, the method comprising:
   calling an I/O function by the application code on the target processor;
   referring to a library application programming interface (API) function corresponding to the I/O function;
   performing a DMA transfer to a memory area accessible to the target processor in response to the library API function, wherein
      the memory area is external to a memory used by the target processor to execute the application code,
      the memory area is accessible to a debugger executing on the host processor, and
      the DMA transfer stores I/O operation parameters in the memory area for access by the debugger; and
      a DMA transfer finish flag in the memory area for access by the debugger when the DMA transfer of the I/O operation parameters to the memory area is complete.

10. The method of claim 9 wherein the I/O operation parameters comprise:
    information corresponding to a requested I/O operation type; and
    arguments associated with the requested I/O operation type.

11. The method of claim 9 wherein the memory area is external to the target processor.

12. The method of claim 9 further comprising:
    continuing to execute the application code, by the target processor, after said storing the DMA transfer finish flag.

13. A method for debugging an application code executing on a target processor coupled to a host processor, the method comprising:
    polling a memory area for a DMA transfer finish flag by a debugger executing on the host processor, wherein
       the DMA transfer finish flag is stored in the memory area by the target processor after the target processor stores data associated with an I/O function in the memory area,
       the memory area is external to a memory used by the target processor to execute the application code;
    reading the data stored in the memory area, by the host processor, if the DMA transfer finish flag is present;
    performing the I/O function associated with the data by the host processor.

14. The method of claim 13 further comprising invalidating by the debugger the DMA transfer finish flag after said performing the I/O function.

15. The method of claim 13 wherein the data associated with the I/O function comprises:
    information corresponding to a requested I/O operation type; and
    arguments associated with the requested I/O operation type.

16. The method of claim 13 wherein the memory area is external to the target processor.

17. The method of claim 13 wherein the data associated with the I/O function further comprises:
    data stored by the target processor in response to calling the I/O function by the application code, wherein a DMA transfer storing I/O operation parameters to the memory area is performed in response to a library API function.

18. The method of claim 13 wherein the I/O function comprises one of printing to a standard output, scanning from a standard input, and storing information in a memory.

* * * * *